United States Patent
Wu

(10) Patent No.: US 8,342,082 B2
(45) Date of Patent: Jan. 1, 2013

(54) DETACHABLE GRILL

(75) Inventor: Rongzong Wu, Fujian (CN)

(73) Assignee: Tsann Kuen (China) Enterprise Co., Ltd., Xiamen, Fujian (CN)

( * ) Notice: Subject to any disclaimer, the term of this patent is extended or adjusted under 35 U.S.C. 154(b) by 822 days.

(21) Appl. No.: 12/498,369

(22) Filed: Jul. 7, 2009

(65) Prior Publication Data

US 2010/0000421 A1  Jan. 7, 2010

(30) Foreign Application Priority Data

Jul. 7, 2008 (CN) .......................... 2008 2 0102969

(51) Int. Cl.
*A47J 37/07* (2006.01)

(52) U.S. Cl. ....................................................... 99/450

(58) Field of Classification Search .................. 99/422, 99/426, 427, 450, 449, 451, 421 HV, 339, 99/337, 375, 376, 377; 411/80.2, 349, 348, 411/105, 108, 109, 110, 111, 112, 352; 292/283, 292/148, 125, 141, 154, 171, 204, 225, 235, 292/254, 38, 50, 58, 61, 70, 76, 84; 248/621, 248/27.1, 239, 544, 460; 24/634, 613, 607, 24/580.1, 618, 649, 701; 225/10; 219/697, 219/696, 386, 125.38; 134/201; D7/332; 296/100.16; 49/141; 52/202; D8/339

See application file for complete search history.

(56) References Cited

U.S. PATENT DOCUMENTS

| | | | | | |
|---|---|---|---|---|---|
| 447,945 | A | * | 3/1891 | Dale ................................ | 99/330 |
| 2,200,702 | A | * | 5/1940 | Oddie ............................ | 411/349 |
| 3,933,144 | A | * | 1/1976 | Bandy ........................... | 126/25 R |
| 4,091,720 | A | * | 5/1978 | Wheeler .......................... | 99/375 |
| 4,270,067 | A | * | 5/1981 | Thomas et al. ................ | 219/438 |
| 4,476,848 | A | * | 10/1984 | Protas ........................... | 126/19 M |
| 4,862,795 | A | * | 9/1989 | Hawkins .......................... | 99/446 |
| 5,211,105 | A | * | 5/1993 | Liu .................................. | 99/446 |
| 5,546,851 | A | * | 8/1996 | Goto .............................. | 99/446 |
| 6,186,054 | B1 | * | 2/2001 | Hung .............................. | 99/339 |
| 6,363,839 | B1 | * | 4/2002 | Wu ................................. | 99/375 |
| 6,429,409 | B1 | * | 8/2002 | Siu .............................. | 219/450.1 |
| 2010/0000421 | A1 | * | 1/2010 | Wu ................................. | 99/450 |

OTHER PUBLICATIONS

Web page download, DFCI, 2005,www.dfcis.com/sI-8400/sI-8415.html, 7 pages.*

* cited by examiner

*Primary Examiner* — Gene Kim
*Assistant Examiner* — M Chambers
(74) *Attorney, Agent, or Firm* — Kening Li; Pinsent Masons LLP

(57) ABSTRACT

A detachable grill comprising a body, a pan detachably mounted on said body and a locking device for connecting said body with said pan, said body having a heating device for heating said pan, wherein said locking device comprises: a sleeve, a connecting nail and a deflecting device, the flange of the lower portion of said sleeve protruding outwardly to form a clamping portion, said sleeve connected to the bottom of said pan by said connecting nail, wherein said deflecting device is movably connected to said body and can abut against the clamping portion or move away the clamping portion selectively. The deflecting device abuts against the clamping portion to prevent the sleeve from sliding upwardly so as to lock and fix the pan.

11 Claims, 5 Drawing Sheets

DETACHABLE GRILL

FIELD OF THE INVENTION

The present invention relates to a grill, and more particularly, to a detachable grill.

BACKGROUND OF THE INVENTION

Traditional grill pan is fixedly connected with the grill body, therefore, it is inconvenient to clean. Because of this disadvantage, the inventor had provided a solution shown and described in CN.PAT.No.CN2820027Y Sep. 27, 2006. with the title of "a separable grill", the grill aforementioned comprises a body, a pan separably mounted on the body and a clamping mechanism for connecting the body with the pan, a heating device for heating pan is mounted on the body, the clamping sheet of the clamping mechanism is made by metal, which has sharp edge and is easy to hurt the users, therefore, this grill is not secure enough to the users.

SUMMARY OF THE INVENTION

The primary object of the present invention is to provide a detachable grill to obviate the disadvantages of not secure enough to the users.

This object is achieved by providing:

A detachable grill comprising a body, a pan detachably mounted on said body and a locking device for connecting said body with said pan, said body having a heating device for heating said pan, wherein said locking device comprising: a sleeve, a connecting nail and a deflecting device, the flange of the lower portion of said sleeve protruded outwardly to form a clamping portion, said sleeve connected to the bottom of said pan by said connecting nail, said deflecting device connected to said body and can abut against the clamping portion or move away the clamping portion.

In a preferred embodiment of the present invention, the outer surface of said clamping portion formed a conical surface.

In a preferred embodiment of the present invention, the locking device further comprises an elastomer disposed between said deflecting device and said body for producing the elasticity to drive the deflecting device closing to the clamping portion.

In a preferred embodiment of the present invention, a button connected to said body and drivingly connected to said deflecting device.

In a preferred embodiment of the present invention, said deflecting device comprises a middle portion, a control portion and a driving portion, said control portion and said driving portion arranged on the two sides of the middle portion respectively, wherein said middle portion rotatably connected to said body, said control portion can abut against the clamping portion or move away said clamping portion selectively.

In a preferred embodiment of the present invention, said button slidably connected to said body and the sliding of said button formed a driving connection with the rotation of said deflecting device.

In a preferred embodiment of the present invention, said elastomer disposed between the driving portion of said deflecting device and said body, and said button drivingly connected to said driving portion.

In a preferred embodiment of the present invention, the driving portion of said deflecting device having a sliding groove, a driving rod fixed under the said button, and said driving rod slidably connected within said groove.

In a preferred embodiment of the present invention, the sliding direction between said groove and said driving rod is different to the sliding direction between said button and said body.

In a preferred embodiment of the present invention, said locking device further comprises a connecting hole disposed in said body, wherein the internal diameter of said connecting hole is larger than the maximum external diameter of the clamping portion of said sleeve, and said deflecting device positioned under said connecting hole.

In a preferred embodiment of the present invention, said sleeve is hollow and said connecting nail is a rivet.

In a preferred embodiment of the present invention, the upper portion of said sleeve protruded outwardly to form a connecting portion, said connecting portion abut against the bottom of said pan.

Compared with the prior art, the deflecting device abut against the clamping portion to prevent the sleeve from sliding upwardly so as to lock and fix the pan, therefore, the present invention has the following advantages:, firstly, the locking and fixation is reliable and stable; secondly, the sleeve will not hurt the users and is secure. The outer surface of the hooking portion formed a conical surface thus has guiding function to facilitate to assemble the grill. Having elastomer can achieve automatically lock, and this locking is convenient, rapid and stable. The deflecting device rotatably connected to the body, and the locking and release is proceeded by rotating the deflecting device, which is convenient, rapid and only occupies small room. The sliding of the button formed a driving connection with the rotation of the deflecting device, the rotation of the deflecting device can be controlled by sliding the button, this control is convenient. The connecting nail is rivet, rivet connection is stable and secure.

BRIEF DESCRIPTION OF THE DRAWINGS

These and other features and advantages of the invention will become more readily apparent when reading the following description and claims in conjunction with the accompanying drawings.

DETAILED DESCRIPTION OF THE INVENTION

Figure 1:
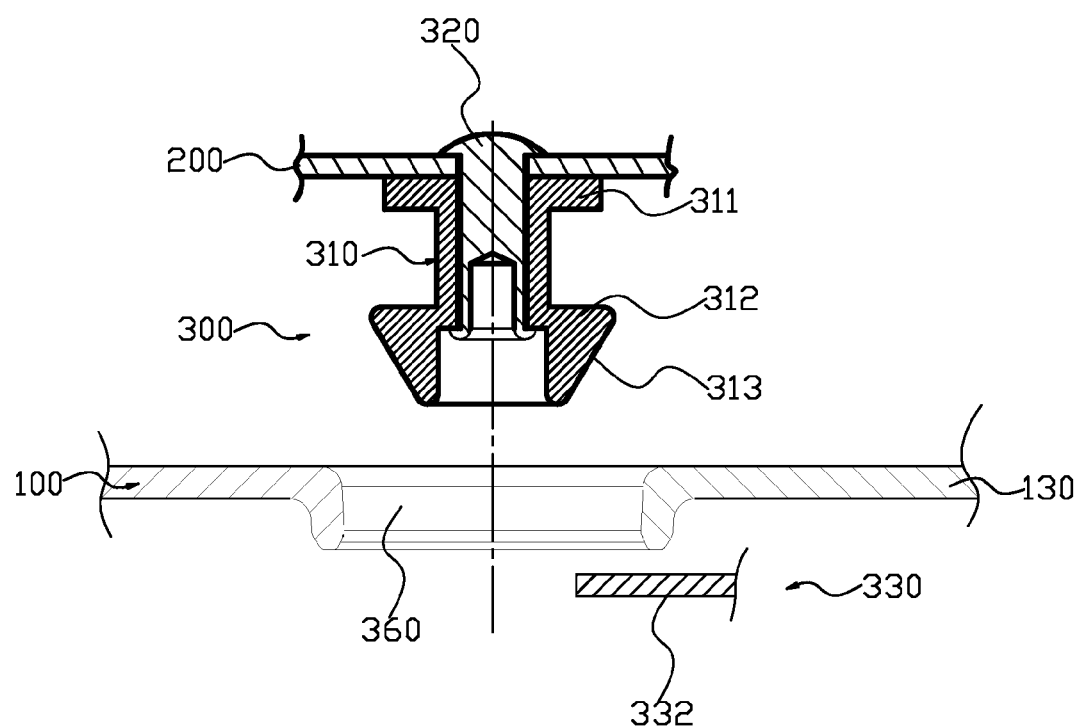
FIG. 1 is a schematic view of the detachable grill in a preferred embodiment, wherein the pan is in separated status.
Figure 2:
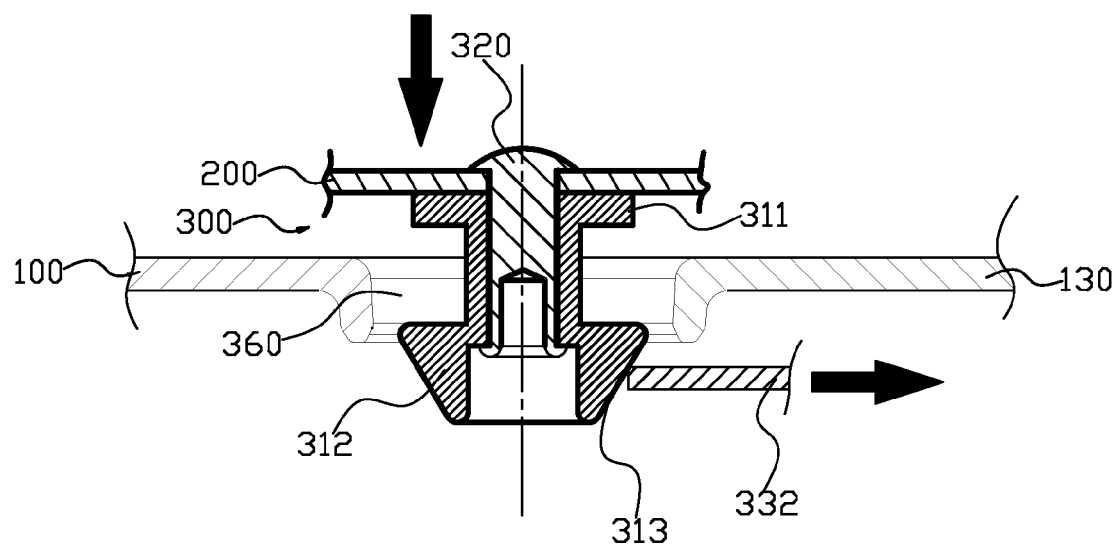
FIG. 2 is a schematic view of the detachable grill in a preferred embodiment, wherein the pan is in assembling process.
Figure 3:
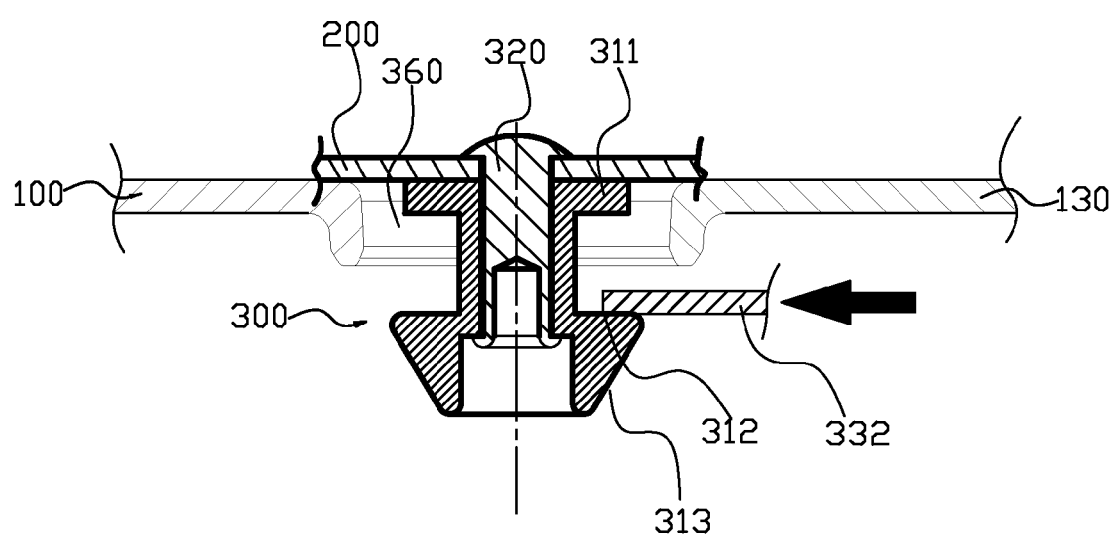
FIG. 3 is a schematic view of the detachable grill in a preferred embodiment, wherein the pan is in fixed status.

Referring to FIG. 1, FIG. 2 and FIG. 3, a detachable grill comprises a body 100, a pan 200 and a locking device 300.

Figure 4:
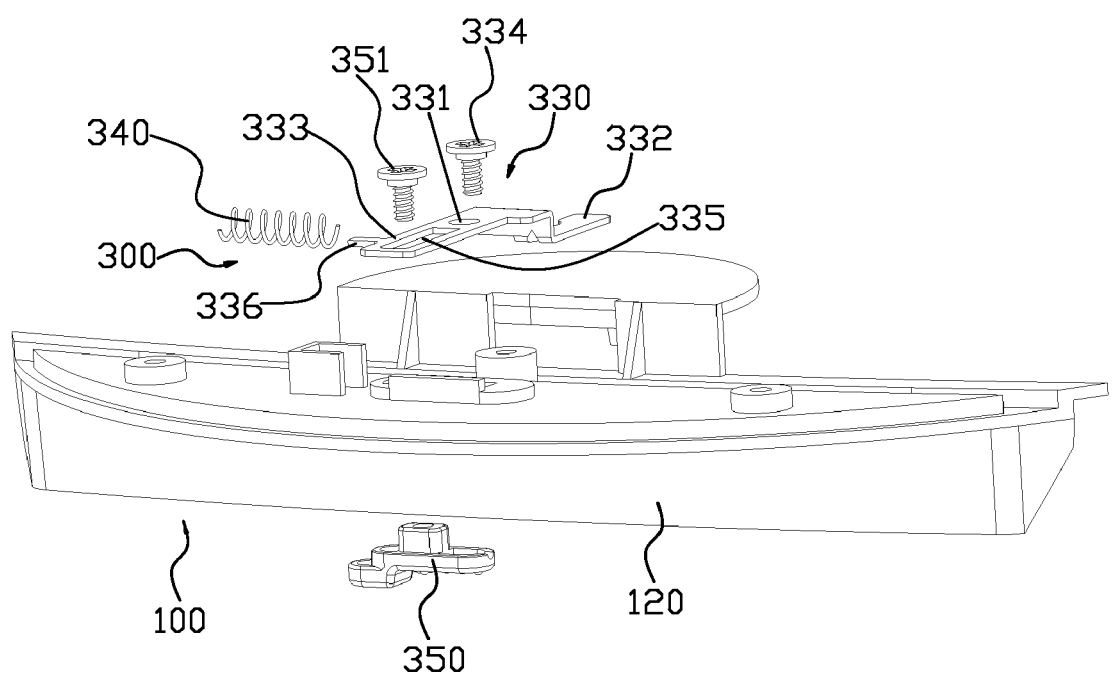
FIG. 4 is an exploded view of the locking device of the detachable grill in a preferred embodiment
Figure 5:
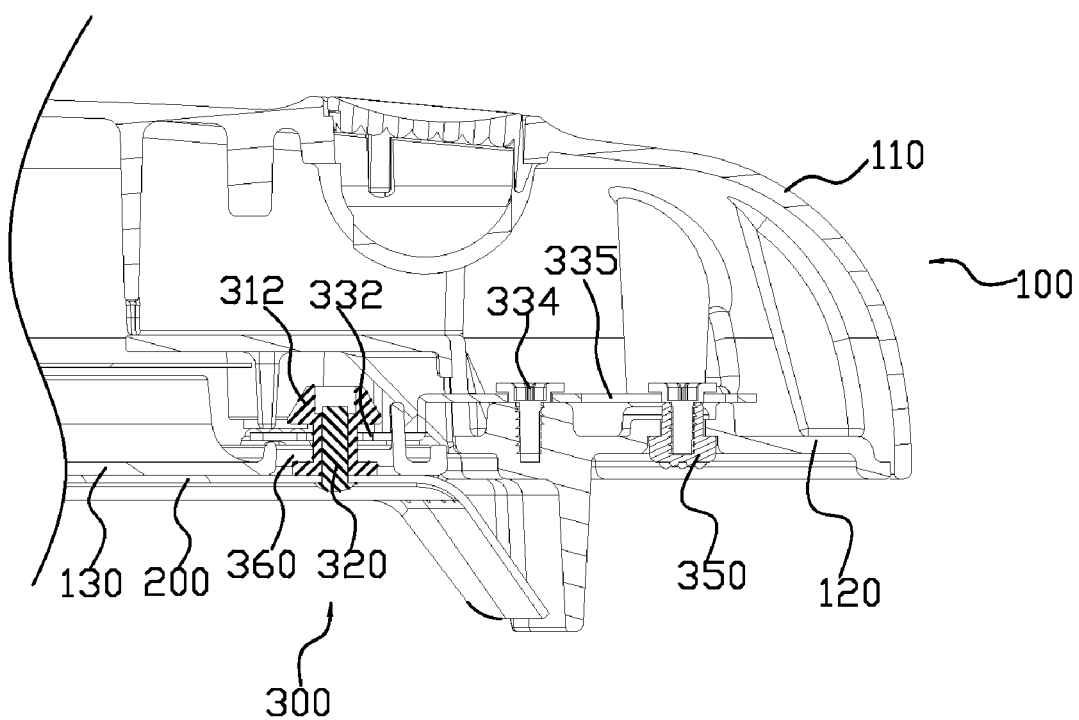
FIG. 5 is a sectional view of the locking device of the detachable grill in a preferred embodiment.

Referring to FIG. 4 and FIG. 5, the body 100 comprises a base 110, and the base 110 having a heating device, two handle covers 120 and a thermal conductive board 130 inside. The two handle covers 120 fixed on the two sides of the base 110 respectively. The thermal conductive board 130 fixed in the base 110 and fixed between the two handle covers 120. The heating device fixed in the base 110 and positioned under the thermal conductive board 130.

Referring to FIG. 1, FIG. 2, FIG. 3, FIG. 4 and FIG. 5, the locking device 300 connected the body 100 with the pan 200 so that the pan 200 detachably mounted on the thermal conductive board 130 of the body 100 and can be heat by the heating device of the body 100.

The locking device 300 comprises: a sleeve 310, a rivet 320, a deflecting device 330, a spring 340, a button 350 and a connecting hole 360.

The sleeve 310 configured to be a shape like a hollow mushroom-head, and the sleeve 310 connected to the bottom of the pan 200 via a rivet 320 to make the pan 200 integrate with the sleeve 310. Herein the upper portion of the sleeve 310 protruded outwardly to form a connecting portion 311, the connecting portion 311 abut against the bottom of the pan 200 to enhance the fixation and stability of the sleeve 310. The lower portion of the sleeve 310 protruded outwardly to form an annular clamping portion 312, the outer surface of said clamping portion 312 formed a conical surface 313, therefore, the conical surface 313 can guide the direction when moved downwardly.

The connecting hole 360 is a through hole disposed on the thermal conductive board 130. Herein the internal diameter of the hole 360 is lager than the external diameter of the clamping portion of the sleeve 310 so that the clamping portion of the sleeve 310 can pass through the connecting hole 360 freely.

The deflecting device 330 consisted of a middle portion 331, a control portion 332 and a driving portion 333, said control portion 332 and said driving portion 333 arranged on the two sides of the middle portion 331 respectively. The middle portion 331 connected to the bottom of the handle cover 120 via a rotating shaft 334 so that the deflecting device 330 rotatably abut against the bottom of the handle cover 120 and the deflecting device 330 positioned under the connecting hole 360. As is shown in the figures, to reduce the friction between the deflecting device 330 and the handle cover 120, the deflecting device 330 configured to a Z-shape and the connecting portion of the handle cover 120 configured to a protrusion so as to decrease the contacting area to reduce friction. When the control portion 332 rotated, the control portion 332 can insert into or moved away from the cylindrical surface of the connecting hole 360 selectively. The driving portion 333 has a sliding grove 335 and a position projection 336.

One end of the spring 340 abut against the handle cover 120, the other end sleeved on the position projection 336 and abut against the driving portion 333 to make the deflecting device 330 pressed by the elasticity, the elasticity is the action which make the control portion 332 of the deflecting device 330 insert into the cylindrical surface of the connecting hole 360.

The button 350 slidably connected on the top of the handle cover 120, and a driving shaft 351 disposed under the button 350, the driving shaft 351 pass through the handle cover 120 and slidably connected in the groove 335 of the deflecting device 330, herein the sliding direction between the groove 335 and the driving shaft 351 is different to the sliding direction between the button 350 and the handle cover 120, thus sliding the button 350 can urge the deflecting device 330 rotate to let the control portion 332 insert into or move away the cylindrical surface of the connecting hole 360. Because the button 350 slidably connected to the handle cover 120, therefore, when the pan 200 is separated by users, two actions can be proceeded at the same time, one is to loose the locking status and the other is to remove the pan 200 upwardly.

Referring to FIG. 1, FIG. 2 and FIG. 3, the assemble proceed comprises: aim the sleeve 310 to the connecting hole 360, then move the pan 200 downwardly; when the conical surface 313 of the sleeve 310 contact to the control portion 332 of the deflecting device 330, if move downwardly continually the conical surface 313 will urge the control portion 332 to overcome the elasticity of the spring 340 to move away the sleeve 310; when the conical surface 313 is under the deflecting device 330, the deflecting device 330 will be rotated in the elasticity of the spring 340 to drive the control portion 332 to insert the cylindrical surface of the hole 360 and abut against the clamping portion 312, thus prevent the sleeve 310 from moving up, by which the pan 200 is in locked and fixed status. The separation process comprises: slide the button 312, the button 350 drive the deflecting device 330 to rotate to let the control portion 332 move away the clamping portion, thus the locking device 300 released, and remove the pan 200 upwardly to drive the sleeve 310 move upwardly till the pan 200 separated from the body 100 entirely.

Although the present invention has been illustrated and described with reference to the preferred embodiment thereof, it should be understood that it is in no way limited to the details of such embodiment but is capable of numerous modifications within the scope of the appended claims.

What is claimed is:

1. A detachable grill comprising a body, a pan detachably mounted on said body and a locking device for connecting said body with said pan, said body having a heating device for heating said pan,
    wherein said locking device comprises:
        a sleeve having a lower portion with a flange protruding outwardly to form a clamping portion with a conical surface;
        a connecting nail for connecting said sleeve to the bottom of said pan,
        a deflecting device connected to said body and pan, which deflecting device abuts against the clamping portion or can selectively move away from the clamping portion, and
        an elastomeric member disposed between said deflecting device and said body for producing elasticity to drive said deflecting device to close to said clamping portion,
    wherein said body comprises a button connected to said deflecting device,
    wherein said deflecting comprises a middle portion, a control portion and a driving portion, said control portion and said driving portion arranged on two sides of the middle portion respectively, wherein said middle portion is rotatably connected to said body, and said control portion can abut against the clamping portion or move away from said clamping portion,
    wherein said button is slidably connected to said body and the sliding of said button forms a driving connection with the rotation of said deflecting device, and
    wherein said elastomeric member is disposed between the driving portion off said deflecting device and said body and said button is drivingly connected to said driving portion.

2. The detachable grill according to claim 1, wherein said driving portion has a sliding groove, a driving rod is fixed under the button, and said driving rod is slidably connected within said groove.

3. The detachable grill according to claim 2, wherein the sliding direction between said groove and said driving rod is different from the sliding direction between said button and said body.

4. The detachable grill according to claim 1, wherein said sleeve is hollow and said connecting nail is a rivet.

5. The detachable grill according to claim 4, wherein the upper portion of said sleeve protrudes outwardly to form a connecting portion, and said connecting portion abuts against the bottom of said pan.

6. The detachable grill according to claim 1, wherein said locking device further comprises a connecting hole disposed in said body, wherein the internal diameter of said connecting hole is larger than the maximum external diameter of the clamping portion of said sleeve, and said deflecting device is positioned under said connecting hole.

7. A detachable grill comprising a body, a pan detachably mounted on said body and a locking device for connecting said body with said pan, said body having a heating device for heating said pan, wherein said locking device comprises:
a sleeve having a lower portion with a flange protruding outwardly to form a clamping portion with a conical surface;
a connecting nail for connecting said sleeve to the bottom of said pan,
a deflecting device connected to said body and pan, which deflecting device abuts against the clamping portion or can selectively move away from the clamping portion, and
an elastomeric member disposed between said deflecting device and said body for producing elasticity to drive said deflecting device to close to said clamping portion, wherein said body comprises a button connected to said deflecting device, wherein said deflecting device comprises a middle portion, a control portion and a driving portion, said control portion and said driving portion arranged on two sides of the middle portion respectively, wherein said middle portion is rotatably connected to said body, and said control portion can abut against the clamping portion or move away from said clamping portion, wherein said button is slidably connected to said body and the sliding of said button forms a driving connection with the rotation of said deflecting device, and wherein said driving portion has a sliding groove, a driving rod is fixed under the button, and said driving rod is slidably connected within said groove.

8. The detachable grill according to claim 7, wherein the sliding direction between said groove and said driving rod is different from the sliding direction between said button and said body.

9. The detachable grill according to claim 7, wherein said locking device further comprises a connecting hole disposed in said body, wherein the internal diameter of said connecting hole is larger than the maximum external diameter of the clamping portion of said sleeve, and said deflecting device is positioned under said connecting hole.

10. The detachable grill according to claim 7, wherein said sleeve is hollow and said connecting nail is a rivet.

11. The detachable grill according to claim 10, wherein the upper portion of said sleeve protrudes outwardly to form a connecting portion, and said connecting portion abuts against the bottom of said pan.

\* \* \* \* \*